United States Patent [19]
Sahm

[11] Patent Number: 5,758,995
[45] Date of Patent: Jun. 2, 1998

[54] SPINDLE HEAD WITH COOLANT FEED

[75] Inventor: Detlef Dieter Sahm, Reichenbach, Germany

[73] Assignee: Sauter Feinmechanik GmbH, Metzingen, Germany

[21] Appl. No.: 637,239

[22] Filed: Apr. 24, 1996

[30] Foreign Application Priority Data

May 9, 1995 [DE] Germany ............... 195 16 986.7

[51] Int. Cl.$^6$ ............... B23B 51/06; B23B 19/02
[52] U.S. Cl. ............... 408/57; 279/20; 408/56; 409/136
[58] Field of Search ............... 408/56, 57, 61, 408/59; 409/136; 279/20

[56] References Cited

U.S. PATENT DOCUMENTS

| 2,933,321 | 4/1960 | Cascone | 279/20 |
|---|---|---|---|
| 2,937,029 | 5/1960 | Colby | 279/20 |
| 4,708,538 | 11/1987 | Kubo et al. | 279/20 |
| 5,439,333 | 8/1995 | Kubo | 408/57 |

FOREIGN PATENT DOCUMENTS

| 434023 | 6/1991 | European Pat. Off. | 408/57 |
|---|---|---|---|
| 4102937 | 8/1992 | Germany . | |
| 4205273 | 12/1992 | Germany . | |
| 152642 | 7/1987 | Japan | 409/136 |
| 2103123 | 2/1983 | United Kingdom | 408/59 |

OTHER PUBLICATIONS

DIN 69 880, p. 6, part 6, fig. 4., Nov. 1992.
Maschine + Werkzeug 20/1994, pp. 14–16; Dec. 1994.

*Primary Examiner*—Steven C. Bishop
*Attorney, Agent, or Firm*—Roylance, Abrams, Berdo & Goodman, L.L.P.

[57] ABSTRACT

A spindle head for tools with interior coolant feed can be inserted in a tool face with receiving and holding bores. A tensioning device for the spindle carries the shaft of the tool and is mounted rotatably in the spindle head housing by a spindle end segment. A coolant conduit is located in a spindle head cover on the tool side and above the spindle mounting. An annular groove open toward the spindle end segment is provided in the spindle head cover. A coolant feed passage opens into the annular groove. The end segment of the spindle has a connecting passage with one end opening in the annular zone of the outer surface of the end segment aligned with the annular groove and with another end opening in a chamber of the spindle. An inlet opening of the coolant passage in the shaft end of the tool is connected with the chamber. The annular groove is sealed on the outside by an exterior gap tightening and on the inside from the spindle mounting by an interior gap tightening. Both the exterior and interior gap tightenings are limited by the outside surface of the spindle and the inside surface of the spindle head cover.

26 Claims, 1 Drawing Sheet

SPINDLE HEAD WITH COOLANT FEED

FIELD OF THE INVENTION

The present invention relates to a spindle head for tools with interior coolant feed, which can be mounted in a tool face of a tool turret.

BACKGROUND OF THE INVENTION

Traditional spindle heads have nozzles directing coolant streams on the machining areas. Other known spindle heads have tool shafts, such as those of DIN 69880, which facilitate the use of tools having interior coolant transmission. The coolant transmission is between the two mountings of the tool axis for the straight spindle heads. Disadvantageously, even with minor leakage from the coolant transmission path, the mounting of the spindle head comes in contact with the coolant, and thereby, suffers both short-term and long-term damaging effects.

In the known angled spindle heads, the coolant transmission takes place behind the mountings of the tool axes. In this arrangement, however, on account of the danger of collision with other tools, there is not very much space present even at best. Thus, compromises must be made in the lining up of the turret with the tools.

SUMMARY OF THE INVENTION

Objects of the present invention are to provide a spindle head for tools with interior coolant feed which precludes any requirement for such compromises in arrangement and which especially guarantees that the spindle mounting cannot be compromised.

The foregoing objects are basically obtained by a spindle head for tools with an internal coolant feed, comprising a spindle head housing having a spindle mounting, and a spindle rotatably mounted in the housing in the spindle mounting about a spindle longitudinal axis. The spindle has first and second end segments joined by a middle segment and has an outer surface. A tensioning means in the second end segment of the spindle receives and secures a tool shaft in the spindle. A spindle head cover is connected to the housing adjacent the tensioning means, and has an inner surface and an outer surface. A coolant conduit extends in the spindle head cover. An annular groove in the inner surface of the spindle head cover opens to the second end segment of the spindle. A coolant feed passage extends between and opens into the annular groove and the coolant conduit. A connecting passage in the second end segment of the spindle has a first end opening on the outer surface of the second end segment aligned with the annular groove, and a second end opening in a chamber of the spindle for receiving a tool and for connecting to a coolant passage in the tool. An exterior gap tightening between the spindle head cover and the second end segment seals the annular groove on an outer side thereof. An interior gap tightening between the spindle head cover and the second end segment seals the annular groove on an inner side thereof from the spindle mounting. The gap tightenings are defined by the outer surface of the second end segment and the inner surface of the spindle head cover.

In this manner, the coolant transmission occurs in front of the spindle mounting on the tool side. The coolant transmission area is sealed by means of the gap tightenings. No further sealing arrangement is used to seal the working area that is on the tool side.

In one preferred embodiment, a touching seal is provided between the interior gap tightening and the spindle mounting. Also a drainage passage extends from the side of the touching seal proximate the interior gap tightening to the outside of the spindle head cover. The very small coolant volume which can pass through the interior gap tightening strikes the touching seal. Because of the drainage passage, pressure cannot build up on this touching seal. Thus, normally no coolant can pass through between the touching seal and the spindle.

To overcome wear of the touching seal and the decreased sealing effect thereof over time, a second touching seal can be provided between the first touching seal and the spindle mounting. A second drainage passage can extend from the intermediate chamber between the two touching seals to the outside of the spindle head cover. This second drainage passage can prevent pressure build-up in the coolant. As a result of this arrangement, it can be guaranteed through very long time cycles that no coolant whatsoever can get to the mounting of the spindle.

In one preferred embodiment, the longitudinal axis of the coolant feed passage opening into the annular groove forms an acute angle with the longitudinal axis of the spindle and penetrates the inner surface of the spindle head cover at distance from the end surface over which the tool projects. This penetration is at such a distance from the end surface that the coolant feed passage can be bored out from this interface side. Closing the bore is then avoided which closing is required if the boring is made from the outside cover surface of the spindle head cover.

In one preferred embodiment, the coolant feed passage connects the annular groove with a bore provided in the spindle head housing. The bore is connected with a bore of a pin on the tool face which can be introduced into a receiver and holder of the spindle head housing. This bore provided in the spindle head opens preferably in the end surface of the spindle head cover over which the tool projects. A closable nozzle can then be inserted in this opening, so that the spindle head can be used selectively for tools with exterior coolant feed and tools with interior coolant feed.

Other objects, advantages and salient features of the present invention will become apparent from the following detailed description, which, taken in conjunction with the annexed drawing, discloses a preferred embodiment of the present invention.

BRIEF DESCRIPTION OF THE DRAWINGS

Referring to the drawing which forms a part of this disclosure.

DETAILED DESCRIPTION OF THE INVENTION

Figure 1:
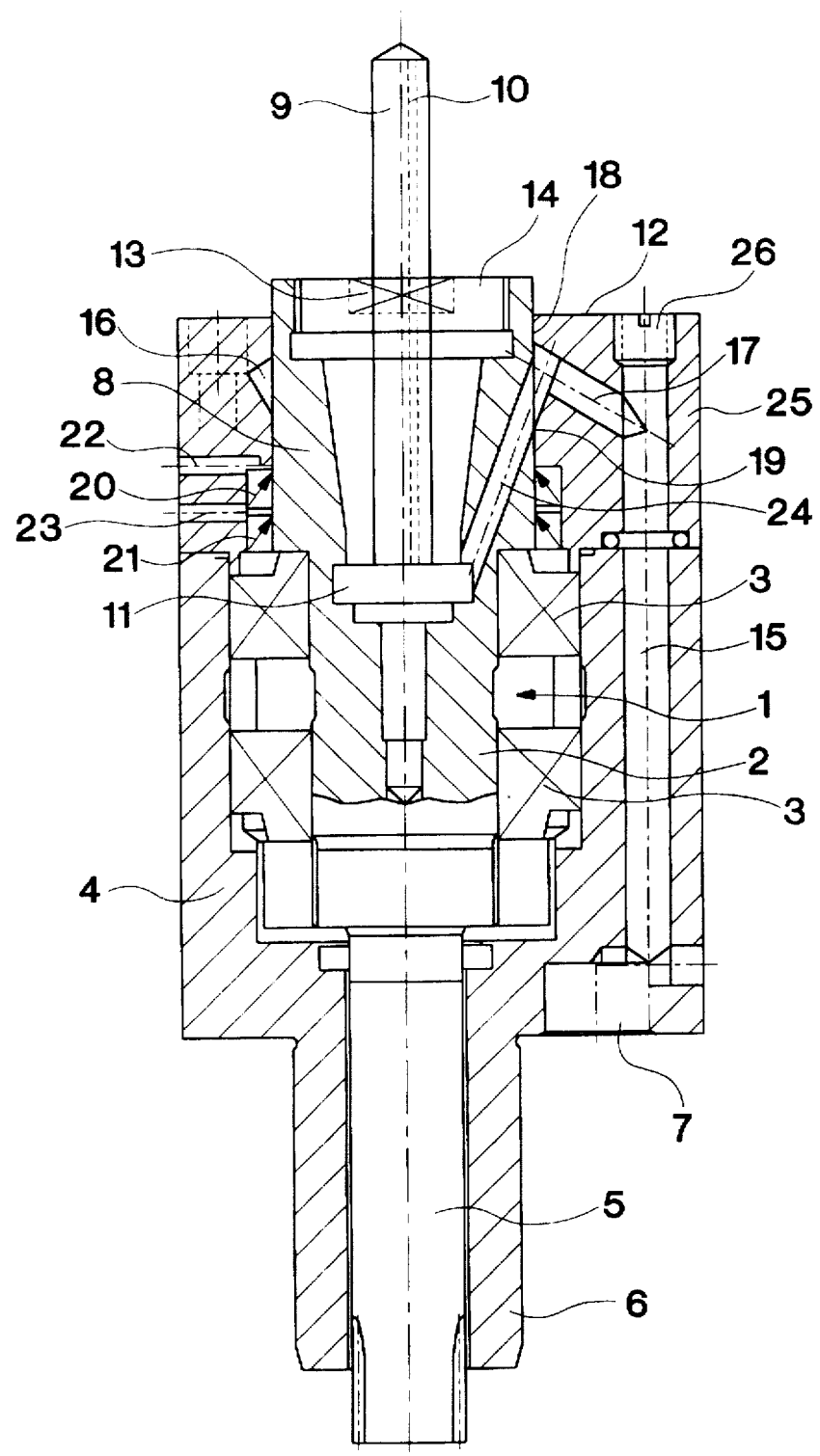
FIG. 1 is a side elevational view in section of a spindle head according to the present invention.

A spindle 1 is mounted for rotation at its middle segment 2 by means of two roller bearings 3 spaced apart from one another in axial alignment in a spindle head housing 4. One end segment 5 of spindle 1 extends through a hollow shaft 6 constructed on spindle head housing 4, and extends out beyond the open end of shaft 6. Hollow shaft 6 is attachable to a housing interface surface. A pin bore 7 and hollow shaft 6 are configured so that shaft 6 can be joined in a tool receiver and holder as in DIN 69880, the subject matter of which is hereby incorporated by reference. The toothed end segment of spindle 1, extending beyond hollow shaft 6, can be coupled with a drive shaft.

The other end segment 8 of spindle 1 is arranged in a bore of spindle head cover 25. The bore and end segment diameters are such that the outside surface of end segment 8 and the inside surface of this bore form a gap tightening or gap joint with a very small clearance.

End segment 8 and middle segment 2 of spindle 1 include a tensioning device for the shaft of a tool 9, for example a drill. This tool, preferably, has an interior coolant passage 10. When the shaft of tool 9 is inserted completely into the tensioning device and this device is connected tightly with spindle 1, forming a seal, interior coolant passage 10 is arranged with its inside end connected with a chamber 11. As shown in the drawing, chamber 11 is located in the middle segment 2 of spindle 1.

The end segment 8 of spindle 1 extends beyond that end surface 12 of spindle head cover 25 from which tool 9 projects. In this embodiment, the tool part projecting outward beyond end surface 12 is provided with a flat key face 13 to securely maintain spindle 1 in place while a tensioning screw 14 is rotated for tensioning the tool shaft. Tensioning screw 14 is provided with openings (not shown) for aligning a key parallel to the tightening screw central bore.

Pin bore 7 is connected through passage 15 with a nozzle 26, located in end surface 12 of spindle head cover 25. Nozzle 26 is sealed closed when a tool with interior coolant passage 10 is being used. If a tool without an interior coolant passage is tensioned in place by means of the tensioning device, nozzle 26 is opened and the coolant stream is directed on the machining area.

An annular groove 16 is provided in spindle head cover 25 at some distance from end surface 12 of spindle head cover 25 in its inner surface surrounding end segment 8 of spindle 1. As shown in the drawing, the groove has a transverse cross-sectional shape in the form of a right-angle triangle. The triangle side corresponding to the hypotenuse forms the side of annular groove 16 opening to the spindle.

A coolant feed passage 17 opens into annular groove 16. The other end of passage 17 opens into passage 15.

As shown in the drawing, the outer side of annular groove 16 (i.e., the side closer to end surface 12) is sealed by an exterior gap tightening or fissure seal 18. The inner side of annular groove 16 against roller bearings 3 is sealed off by an interior gap tightening or fissure seal 19. The gap tightenings prevent leakage by providing a very small gap between the defining surfaces, which are not subjected to wear. Leakage through exterior gap tightening 18 is not disruptive. On the other hand, coolant must be prevented from getting to roller bearings 3.

For preventing exposure of roller bearing 3 to coolant, a first sealing ring or gasket 20 is mounted adjacent to interior gap tightening 19 in the vicinity of roller bearings 3. Sealing ring 20 lies in a groove in the inner wall of spindle head cover 25, and engages the outside surface of spindle 1. Between first sealing ring or gasket 20 and roller bearings 3, a second sealing ring or gasket 21 is arranged at some distance from first sealing ring or gasket 20. Second sealing ring 21 is also arranged in an annular groove in the inner wall of spindle head cover 25 and engages the outside surface of end segment 8 of spindle 1. Rings 20 and 21 form touching seals.

A first drainage passage 22 extends radially outward from the intermediate chamber between interior gap tightening 19 and the first sealing ring or gasket 20, and opens on the outside surface of spindle head cover 25. A second drainage passage 23 extends from the intermediate chamber between first sealing ring or gasket 20 and second sealing ring or gasket 21 radially outward to the outside surface of spindle head cover 25. The first drainage passage 22 prevents the coolant which passes through the inside tight clearance of gap tightening 19 from being subject to pressure build-up on first sealing ring or gasket 20. With this arrangement, the sealing effect of sealing ring or gasket 20 is considerably improved.

Especially after very long running time, a very small coolant volume could pass between first sealing ring or gasket 20 and spindle 1. This coolant is then conducted through the second drainage passage 23. The second sealing ring or gasket 21 is minimally loaded, and thus, can remain reliable over long time cycles in preventing coolant from getting into roller bearings 3.

A connection passage 24 is present in end segment 8 of spindle 1. The connection passage opening on the outside surface of end segment 8 of spindle 1 is aligned with annular groove 16. The other end of connection passage 24 opens in chamber 11. From chamber 11, the coolant in interior coolant passage 10 of tool 9 is pressed out with the required pressure. Chamber 11 is continuously supplied with coolant. Because chamber 11 is displaced axially away from annular groove 16, connection passage 24 which is formed by a bore extends at an acute angle relative to the spindle longitudinal axis.

The present invention is not limited to certain straight spindle heads. For angled spindle heads, the coolant can be fed in a corresponding manner to the interior coolant passage. The conduit means to convey the coolant from spindle head cover 25 to spindle 1 can be constructed in a suitable manner. The sealing of the conduits can have a corresponding suitable configuration.

While a particular embodiment has been chosen to illustrate the invention, it will be understood by those skilled in the art that various changes and modifications can be made therein without departing from the scope of the invention as defined in the appended claims.

What is claimed is:

1. A spindle head for tools with an internal coolant feed, comprising:

a spindle head housing having a spindle mounting;

a spindle rotatably mounted in said housing in said spindle mounting about a spindle longitudinal axis, said spindle having first and second end segments joined by a middle segment and having an outer surface;

a tensioning means, in said second end segment of said spindle, for receiving and securing a tool shaft in said spindle;

a spindle head cover connected to said housing adjacent said tensioning means, said spindle head cover having an end surface, an inner surface and an outer surface;

a coolant conduit in said spindle head cover;

an annular groove in said inner surface of said spindle head cover open to said second end segment of said spindle;

a coolant feed passage extending between and opening into said annular groove and said coolant conduit, said coolant feed passage extending along a passage longitudinal axis oriented at an acute angle relative to said spindle longitudinal axis, said passage longitudinal axis extending through said inner surface of said spindle head cover at such a distance from said outer surface of said spindle head cover that said coolant feed passage can be bored from said end surface of said spindle head cover;

a connecting passage in said second end segment of said spindle, a first end of said connecting passage opening on said outer surface of said second end segment and aligned with said annular groove, a second end of said connecting passage opening in a chamber of said spindle for receiving a tool and for connecting to a coolant passage in the tool;

an exterior gap tightening between said spindle head cover and said second end segment sealing said annular groove on an outer side thereof; and an interior gap tightening between said spindle head cover and said second end segment sealing said annular groove on an inner side thereof from said spindle mounting, said gap tightenings being defined by said outer surface of said second end segment and said inner surface of said spindle head cover.

2. A spindle head according to claim 1 wherein a first touching seal is mounted in said spindle head cover between said interior gap tightening and said spindle mounting; and a first drainage passage extends from a side of said first touching seal proximate said interior gap tightening to said outer surface of said spindle head cover.

3. A spindle head according to claim 2 wherein a second touching seal is mounted in said spindle head cover between said first touching seal and said spindle mounting; and a second drainage passage extends from a chamber between said touching seals to said outer surface of said spindle head cover.

4. A spindle head according to claim 3 wherein each of said touching seals comprises a sealing ring mounted in an annular groove in said spindle head cover; and each of said drainage passages comprises a bore extending through a wall of said spindle head cover.

5. A spindle head according to claim 1 wherein said annular groove is defined by first and second conical surfaces which are conical relative to said spindle longitudinal axis, said conical surfaces being perpendicular; and said passage longitudinal axis extends perpendicular to said first conical surface.

6. A spindle head according to claim 5 wherein said connecting passage comprises a bore extending along a longitudinal axis at an acute angle relative to said spindle longitudinal axis.

7. A spindle head according to claim 1 wherein said spindle head housing comprises a coolant bore, said coolant bore having connection means for receiving and holding a pin with a bore to be connected with said coolant bore; and said coolant passage connects said annular groove with said coolant bore.

8. A spindle head according to claim 7 wherein said coolant bore opens at an end surface of said spindle head cover adjacent said tensioning means through an outlet, said outlet receiving a sealable nozzle.

9. A spindle head according to claim 1 wherein a tool is received in said spindle and extends beyond an adjacent end surface of said spindle head cover, said tool having a flat key face in an extending segment thereof; and said tensioning means comprises a tensioning screw engaging said flat key face.

10. A spindle head according to claim 1 wherein said spindle head cover is directly and fixedly connected to said spindle head housing.

11. A spindle head for tools with an internal coolant feed, comprising:

a spindle head housing having a spindle mounting;

a spindle rotatably mounted in said housing in said spindle mounting about a spindle longitudinal axis, said spindle having first and second end segments joined by a middle segment and having an outer surface;

a tensioning means, in said second end segment of said spindle, for receiving and securing a tool shaft in said spindle;

a spindle head cover connected to said housing adjacent said tensioning means, said spindle head cover having an inner surface and an outer surface;

a coolant conduit in said spindle head cover;

an annular groove in said inner surface of said spindle head cover open to said second end segment of said spindle;

a coolant feed passage extending between and opening into said annular groove and said coolant conduit;

a connecting passage in said second end segment of said spindle, a first end of said connecting passage opening on said outer surface of said second end segment and aligned with said annular groove, a second end of said connecting passage opening in a chamber of said spindle for receiving a tool and for connecting to a coolant passage in the tool;

an exterior gap tightening between said spindle head cover and said second end segment sealing said annular groove on an outer side thereof;

an interior gap tightening between said spindle head cover and said second end segment sealing said annular groove on an inner side thereof from said spindle mounting, said gap tightenings being defined by said outer surface of said second end segment and said inner surface of said spindle head cover; and a coolant bore in said spindle head housing, said coolant bore having connection means for receiving and holding a pin with a bore to be connected with said coolant bore, said coolant passage connecting said annular groove with said coolant bore, said coolant bore opening at an end surface of said spindle head cover adjacent said tensioning means through an outlet, said outlet receiving a sealable nozzle.

12. A spindle head according to claim 11 wherein a first touching seal is mounted in said spindle head cover between said interior gap tightening and said spindle mounting; and a first drainage passage extends from a side of said first touching seal proximate said interior gap tightening to said outer surface of said spindle head cover.

13. A spindle head according to claim 12 wherein a second touching seal is mounted in said spindle head cover between said first touching seal and said spindle mounting; and a second drainage passage extends from a chamber between said touching seals to said outer surface of said spindle head cover.

14. A spindle head according to claim 13 wherein each of said touching seals comprises a sealing ring mounted in an annular groove in said spindle head cover; and each of said drainage passages comprises a bore extending through a wall of said spindle head cover.

15. A spindle head according to claim 13 wherein said coolant feed passage extending along a passage longitudinal axis oriented at an acute angle relative to said spindle longitudinal axis, said passage longitudinal axis extending through said inner surface of said spindle head cover at such a distance from said outer surface of said spindle head cover that said coolant feed passage can be bored from said end surface of said spindle head cover;

said annular groove is defined by first and second conical surfaces which are conical relative to said spindle longitudinal axis, said conical surfaces being perpendicular; and said passage longitudinal axis extends perpendicular to said first conical surface.

16. A spindle head according to claim 15 wherein said connecting passage comprises a bore extending along a longitudinal axis at an acute angle relative to said spindle longitudinal axis.

17. A spindle head according to claim 11 wherein a tool is received in said spindle and extends beyond an adjacent end surface of said spindle head cover, said tool having a flat key face in an extending segment thereof; and said tensioning means comprises a tensioning screw engaging said flat key face.

18. A spindle head according to claim 11 wherein said spindle head cover is directly and fixedly connected to said spindle head housing.

19. A spindle head for tools with an internal coolant feed, comprising:

a spindle head housing having a spindle mounting;

a spindle rotatably mounted in said housing in said spindle mounting about a spindle longitudinal axis, said spindle having first and second end segments joined by a middle segment and having an outer surface;

a tensioning means, in said second end segment of said spindle, for receiving and securing a tool shaft in said spindle;

a spindle head cover directly and fixedly connected to said housing adjacent said tensioning means, said spindle head cover having an inner surface and an outer surface;

a coolant conduit in said spindle head cover;

an annular groove in said inner surface of said spindle head cover open to said second end segment of said spindle;

a coolant feed passage extending between and opening into said annular groove and said coolant conduit;

a connecting passage in said second end segment of said spindle, a first end of said connecting passage opening on said outer surface of said second end segment and aligned with said annular groove, a second end of said connecting passage opening in a chamber of said spindle for receiving a tool and for connecting to a coolant passage in the tool;

an exterior gap tightening between said spindle head cover and said second end segment sealing said annular groove on an outer side thereof; and an interior gap tightening between said spindle head cover and said second end segment sealing said annular groove on an inner side thereof from said spindle mounting, said gap tightenings being defined by said outer surface of said second end segment and said inner surface of said spindle head cover.

20. A spindle head according to claim 19 wherein a first touching seal is mounted in said spindle head cover between said interior gap tightening and said spindle mounting; and a first drainage passage extends from a side of said first touching seal proximate said interior gap tightening to said outer surface of said spindle head cover.

21. A spindle head according to claim 20 wherein a second touching seal is mounted in said spindle head cover between said first touching seal and said spindle mounting; and a second drainage passage extends from a chamber between said touching seals to said outer surface of said spindle head cover.

22. A spindle head according to claim 21 wherein each of said touching seals comprises a sealing ring mounted in an annular groove in said spindle head cover; and each of said drainage passages comprises a bore extending through a wall of said spindle head cover.

23. A spindle head according to claim 19 wherein said coolant feed passage extends along a passage longitudinal axis oriented at an acute angle relative to said spindle longitudinal axis, said passage longitudinal axis extends through said inner surface of said spindle head cover at such a distance from an outer surface of said spindle head cover that said coolant feed passage can be bored from said end surface of said spindle head cover;

said annular groove is defined by first and second conical surfaces which are conical relative to said spindle longitudinal axis, said conical surfaces being perpendicular; and said passage longitudinal axis extends perpendicular to said first conical surface.

24. A spindle head according to claim 23 wherein said connecting passage comprises a bore extending along a longitudinal axis at an acute angle relative to said spindle longitudinal axis.

25. A spindle head according to claim 19 wherein said spindle head housing comprises a coolant bore, said coolant bore having connection means for receiving and holding a pin with a bore to be connected with said coolant bore; and said coolant passage connects said annular groove with said coolant bore.

26. A spindle head according to claim 19 wherein a tool is received in said spindle and extends beyond an adjacent end surface of said spindle head cover, said tool having a flat key face in an extending segment thereof; and said tensioning means comprises a tensioning screw engaging said flat key face.

* * * * *